UNITED STATES PATENT OFFICE.

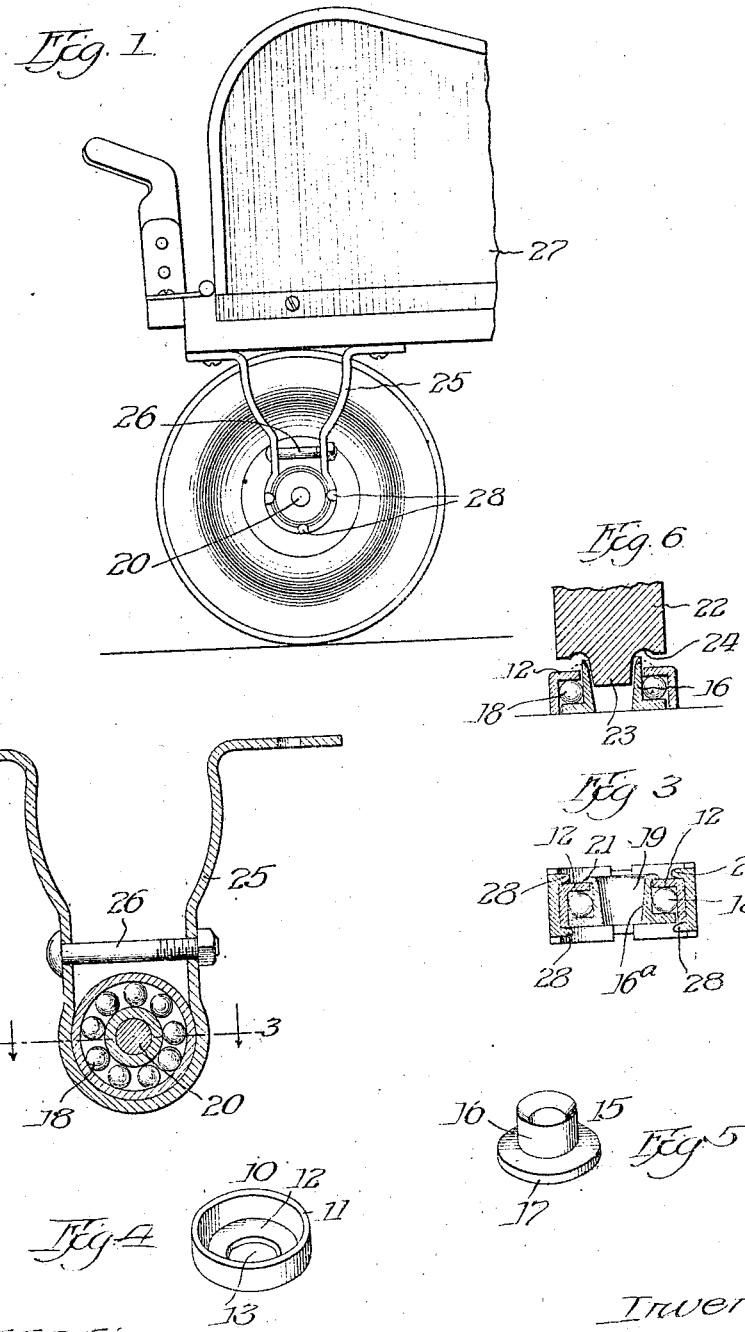

EDWARD KRANTZ, OF CHICAGO, ILLINOIS, ASSIGNOR TO UNITED VACUUM SWEEPER COMPANY, OF CHICAGO, ILLINOIS, A CORPORATION OF DELAWARE.

BEARING.

1,189,262.  Specification of Letters Patent.  Patented July 4, 1916.

Original application filed April 22, 1915, Serial No. 23,026. Divided and this application filed February 3, 1916. Serial No. 75,897.

*To all whom it may concern:*

Be it known that I, EDWARD KRANTZ, a citizen of the United States, and resident of Chicago, in the county of Cook and State of Illinois, have invented certain new and useful Improvements in Bearings, of which the following is a specification.

My invention relates to bearings, and more particularly to such as embody anti-friction rollers or balls.

The principal objects of the invention are to provide a bearing of the character described which is quite simple and strong in construction and effective in service, one which may be made cheaply and expeditiously, and one which, owing to the simplicity, strength and character of its construction is advantageous in installation, replacement, repair, and adjustment to take up wear.

Other objects and advantages will appear hereinafter.

With respect to the form of the bearing structure this application is a division of my allowed application on wheel mountings, filed April 22, 1915, Serial No. 23,026, to which reference is made.

In the accompanying drawings, which form a part of this specification I have illustrated a preferred embodiment of my improved bearing and a convenient and preferred method of forming a retaining bead upon one of the members, as well as one application of the bearing in use, namely upon carpet cleaners adapted to travel upon the floor.

In these drawings Figure 1 is a fragmentary side view of the rear end of such a carpet cleaner with the improved bearing in operative position thereon; Fig. 2 is an enlarged vertical substantially medial sectional view of the hanger and bearing of Fig. 1; Fig. 3 is a horizontal medial section through the complete hanger and bearing of Figs. 1 and 2, as if on the line 3—3 of Fig. 2; Fig. 4 is a perspective of the outer cup or female bearing element; Fig. 5 is a perspective of the inner or male bearing element; and Fig. 6 is a vertical medial section of the bearing and of a fragment of a punch, as during the process of forming a retaining bead on the male part.

The bearing illustrated comprises the female member 10, which is preferably an integrally formed metallic cup-like stamping from sheet steel having the annular flange-like portion 11 upstanding from the side wall portion 12, which side wall portion is centrally apertured, as at 13, to receive loosely and for free rotation therein the free end of the stem of the preferably integrally formed and machine cut steel male bearing element 15. This male element 16 comprises the stem 16 and the disk-like portion 17, the latter being adapted substantially to close the open side of the member 10, and is preferably of somewhat smaller diameter than the interior diameter of the flange 11 so as to be rotatable therein when the several parts are assembled as in Fig. 3. Between the stem 16 and the flange 11 I provide a plurality of anti-friction elements 18, shown as balls. The stem 16 is axially apertured, as at 19, and, for the use illustrated, on preferably slightly tapering lines whereby the shaft 20 may be forced tightly into the central hole 19 and frictionally held therein.

It is not broadly new to provide a bearing of the general character described wherein there are male and female members with antifriction elements between them. Heretofore, however, it has been rather difficult and expensive, and involving additional parts over those illustrated herein, to secure the male and female members operatively together. It is to be understood that the wall 16ª of the stem 16 must be substantially thick to provide sufficient strength and wearing properties. Heretofore it has been suggested to weld upon the central or male part a ring having an outwardly turned flange, such flange being adapted to hold the male member against retraction from the female member, such welding being done after the parts are assembled. According to my present invention the formation of such a separate piece and the welding are avoided, and the parts are secured together strongly and rapidly and without prejudice to the temper of the surfaces forming the raceway for the balls.

Referring to Fig. 5 it will be noted that I form the free end of the stem 16 so that the annular wall thereof at and near the end is relatively thin, and this reduction of the annular wall is preferably on tapering or countersunk lines as illustrated whereby the wall 16ª is substantially thick normally at the side wall 12 so as to resist bending or expansion at the side wall, it thence becoming gradually thinner to the end whereby the end portion may be outturned to form the preferably annular bead 21 coming down close to the side wall 12 of the female member, yet permitting the male element 15 to rotate freely relative to the female part 10. This operation of forming the bead 21 is suitably performed in a punch press, as illustrated in Fig. 6, the punch or former 22 having a pilot 23 adapted to maintain the bearing in its desired position during the operation, and having an annular recess 24 adapted to engage the wall of the stem 16 and overturn the free edge portion lockingly upon the side wall 12. The stroke of the punch is so regulated that the overturning of the edge is not too great to prevent the relative movement of the male and female parts.

For many purposes the surfaces forming the raceway for the antifriction elements, as 18, are case-hardened, but in practice I do not case-harden the end portion of the stem 16, leaving the free edge portion, which is to be turned over, relatively soft and with its natural ductility substantially unimpaired.

In case of wear at and about the bead 21 resulting in looseness the same may be readily remedied by merely applying hammer blows upon the overturned edge portion 21, riveting the parts together as tightly as may be desired. Preferably, however, a bluntly rounded setting tool is employed for this purpose, its use resulting in an equable swaging or riveting of the bead 21.

It will thus be apparent that a strong and serviceable bearing is produced, simply, cheaply and expeditiously and of what I believe to be the irreducible number of parts.

When applying the bearing to the use illustrated I preferably secure the same in the crotch of a metallic strap hanger 25, the legs of which are drawn clampingly together by the bolt 26, the hanger being secured as by screws to the body of the cleaner 27. Preferably a plurality of projections 28 are stamped inward from the strap 25 to hold the bearing against lateral displacement.

While I have illustrated and described a preferred embodiment of my improved bearing and a method for forming it, changes may be made in the same without departing from the spirit of this invention, and I contemplate all such changes as fall within the scope of the appended claims.

I claim:

1. A bearing comprising in combination an integrally formed metallic cup-like female element having an annular flange upstanding from a centrally apertured side-wall, said cup-like element being open on the side thereof opposite said side-wall portion, an integrally formed male bearing element comprising a disk-like portion and a centrally arranged stem circular in cross view upstanding therefrom, one end of said stem terminating free, said stem being axially apertured to accommodate a shaft, the walls of said stem being substantially thick for strength and wear, the free end thereof having a relatively thin annular wall and being adapted to pass loosely through the aperture of said side-wall with said disk-like portion substantially closing the open side of said cup-like element, a plurality of anti-friction elements, between said central stem and the interior surface of said flange, the relatively thin annular wall of said stem being outturned to form an integral bead overlying a portion of said side wall.

2. A bearing comprising in combination an integrally formed metallic cup-like female element having an annular flange upstanding from a centrally apertured side-wall, said cup-like element being open on the side thereof opposite said side-wall portion, an integrally formed male bearing element comprising a disk-like portion and a centrally arranged stem circular in cross view upstanding therefrom, one end of said stem terminating free, said stem being axially apertured to accommodate a shaft, the walls of said stem being substantially thick for strength and wear, the free end thereof having a relatively thin annular wall and being adapted to pass loosely through the aperture of said side-wall with said disk-like portion substantially closing the open side of said cup-like element, a plurality of anti-friction elements between said central stem and the interior surface of said flange, said stem being hardened where said anti-friction elements travel thereon, the relatively thin annular wall of said stem being relatively soft and outturned to form an integral bead overlying a portion of said side wall.

EDWARD KRANTZ.

Witnesses:
T. D. BUTLER,
M. M. KRIESAND.